Patented June 25, 1946

2,402,757

UNITED STATES PATENT OFFICE 2,402,757

LUMINESCENT MATERIAL

Humboldt W. Leverenz, South Orange, N. J., assignor to Radio Corporation of America, a corporation of Delaware No Drawing. Application September 27, 1941, Serial No. 412,687

8 Claims. (Cl. 252—301.6)

My invention relates to improved luminescent materials or phosphors and particularly to dual activated phosphors of the zinc sulphide and sulpho-selenide types.

Various phosphors or luminescent materials exclusively of the inorganic type are characterized by their property of phosphorescing following excitation. In the following description of my invention I will use the term "luminescence" to refer to the light and the property of a phosphor developing light in response to energy excitation and I will use the term "fluorescence" to refer to the light developed during excitation and the term "phosphorescence" to refer to the light liberated by a phosphor subsequent to or following the cessation of excitation. The term "luminescence" will therefore be used to include both fluorescence and phosphorescence. The phosphorescent light of many phosphors is of a different color than the fluorescence of the same phosphor. Consequently, the color of the light liberated by the phosphor under excitation changes following excitation. In addition, the phosphorescence intensity and persistence of such phosphors are relatively low. Prior efforts to provide phosphors having high phosphorescence properties with high phosphorescence efficiency have resulted in a great variance between the fluorescent and phosphorescent output of the phosphors as well as a decrease in the efficiency of the conversion of the incident energy to luminescence.

It is an object of my invention to provide luminescent materials or phosphors of high phosphorescent efficiency without greatly affecting other factors such as the luminescent efficiency and particularly phosphorescent efficiency under or following the usual forms of excitation. It is a further object to provide phosphor materials having long phosphorescent characteristics with high luminescent efficiency, and it is a still further object to provide a controllable increase in phosphorescence without adversely affecting color or efficiency of sulphide phosphors. These and other objects, features and advantages will become apparent to those skilled in the art on consideration of the following description of my invention.

In accordance with my invention I provide a pure zinc sulphide or zinc sulpho-selenide phosphor having a plurality of luminescent activators chosen from the second sub-group of the first group of the periodic system, said activators consisting of copper and silver, copper and gold, silver and gold or copper, silver and gold. While I am aware that the prior art has recommended the use of two activators such as nickel and silver or nickel and copper in a zinc-cadmium sulphide to achieve a decrease in the phosphorescent properties of phosphors, such activation produces a directly opposite result to that which I desire. In addition, the luminescent efficiency of such material suffers by the addition of the two activators. This prior art knowledge is therefore directly contrary to the principal objects of my invention and relates to an entirely dissimilar material, namely, zinc-cadmium sulphides, whereas my invention relates to improved phosphors of the zinc sulphide and zinc sulpho-selenide types.

A plausible theory which may explain my new and improved results as applied to a silver and copper activated zinc sulphide phosphor lies in that the silver activator centers produce an emission band on the short wavelength side of the copper activated phosphor's emission band and that the emission from the silver band is usefully absorbed to re-excite emission in the copper band. This principle may be referred to as cascade excitation wherein an excited material re-excites another material. While I here speak of two materials, it will be appreciated that the single crystals of the zinc sulphide or selenide phosphor incorporate two activators, and I am therefore referring to the two materials merely with respect to the apparent excitation phenomena for ease in explanation. By the use of the two activators, whether they be copper and silver, copper and gold, silver and gold or copper, silver and gold, the period of useful phosphorescence is considerably increased as well as the efficiency of phosphorescence while substantially maintaining or possibly increasing the normal fluorescence efficiency under the usual forms of excitation such as cathode rays, X-rays, ultra violet radiations, radiations from radio active disintegration products, or other forms of corpuscular or radiant energy.

Further in accordance with my invention I control the relative quantities of the two activators incorporated in the luminescent material or phosphor in such a manner that for a silver-copper activated phosphor the quantity of copper as an activator is less than the silver as an activator. Furthermore, for a silver-gold combination of activators the quantity of gold as an activator is chosen to be less than the silver, and similarly for a combined activator of copper and gold the gold utilized is less than the copper. I have found that whatever combination of two activators is chosen the proportion between the amounts of the activators as metals should vary approximately as 1 to 2 to 4 in the order of gold, copper and silver. Also for a copper-silver-gold activated zinc sulphide the quantity of the individual activators may decrease in the order of silver, copper and gold. Thus the gold may be less than the copper and copper less than the silver. The relative proportion of the three activators may be one part gold, two parts copper and four parts silver. However, for varying the phosphorescence characteristics these relative proportions may vary both above and below the optimum proportions. The amount of the copper, silver or gold may vary from 0.0001% to 0.1% molal of each with respect to the zinc sulphide or sulpho-selenide phosphor. The expression "per cent molal" or "molal per cent" means the ratio between the gram moles of the materials, expressed in per cent. In addition, I have found that in a silver-gold activated material the period of useful phosphorescence increase with the amount of gold with respect to silver, and similarly in a copper-silver or copper-gold combination activator the period of useful phosphorescence increases with the quantity of copper and gold respectively. While I have referred to the fact that my invention is applicable to both zinc sulphide and zinc sulpho-selenide, selenium may be wholly substituted for the sulphur content. Similarly, oxygen and tellurium may be substituted in part for the sulphur. Manganese may also be substituted in part for the zinc content of the phosphor without departing from the scope of my invention. Thus the elements of the second subgroup of the sixth group of the periodic system comprising oxygen, selenium and tellurium, in addition to sulphur, may be substituted for the sulphur. However, the objects of my invention are not obtained by a substitution either in whole or in part of cadmium for the zinc content of my phosphor.

I will refer to "luminescence pure" zinc sulphide as the principal constituent of my phosphor. This state of purity is greatly in excess of chemical purity wherein traces of various elements may be tolerated. Thus, as particularly specified in my paper entitled "Cathodoluminescence as applied in television," RCA Review, October 1940, page 138; such purity is considerably beyond the detecting ability of the spectrograph. Such traces or impurities of copper, manganese and lead may be removed prior to precipitation of a "luminescence pure" zinc sulphide by electrolyzing a solution of zinc sulphate followed by precipitation of the pure zinc sulphide with hydrogen sulphide. The purity following such treatment is even greater than spectroscopic purity.

Consequently my luminescent material contains no spectroscopic trace of metallic multivalent activators other than those selected from the group consisting of copper, silver and gold.

As an example of my invention I will refer to a zinc sulphide phosphor activated with copper and silver, although any two or all three activators may be chosen from the group consisting of copper, silver and gold. Thus for this example 500 grams (g.) of "luminescence-pure" zinc sulphide is moistened with an aqueous solution containing 0.1 g. of silver as a soluble salt, 0.05 g. of copper as a soluble salt, 15 g. of sodium or potassium chloride as a flux and 10 g. of barium chloride as a secondary electron emission intensifier. The wet mass is well mixed and stirred to dryness under an infra red lamp or over a water bath and placed in the powdered state in a clean quartz crucible and heated or fired in a clean electric furnace to a temperature above 950° C. and preferably within the range of 1200–1300° C. During the preparation of the raw materials some contamination by foreign matter may result, although such contamination should be held to a strict minimum especially with respect to active agents which affect the spectral characteristics or efficiency of the resulting phosphor. Likewise some contamination and oxidation of the raw materials such as formation of some zinc oxide may occur in firing. While I will refer to my phosphor as consisting of the desired product, I do not necessarily exclude materials which are inadvertently added as contaminating agents or produced as a result of oxidation during firing.

Following firing, the resultant mass is washed in alternate washings of hot doubly distilled water and hot doubly distilled water saturated with hydrogen sulphide. The hydrogen sulphide saturated water for the alternate washings is preferably prepared by saturating the water with hydrogen sulphide at a low temperature, the water being warmed only after being poured over the phosphor. The alternate washings are continued until the chloride content of the wash water is negligible or at least less than 0.001% by weight. The material is then dried and is ready for use, or the material may be placed in a clean ball mill and rolled with Pyrex balls merely to break the aggregates without reducing the particle size of the individual sulphide crystals. The material, ready for use, may be applied as cathode ray tube screens or may be used for coatings in luminescent lamps or wherever long phosphorescent characteristics are desired. Obviously my material may be mixed to form a mechanical mixture with any other phosphor material to provide mixed materials having wide spectral emission ranges.

It will be appreciated that a material made in accordance with my invention is not adapted by wide variation of the activator content to a correspondingly wide variation in the luminescent color output of the phosphor. Neither is my phosphor adapted to the provision of white light or light having a "yellowish white tint similar to sunlight," the color of my material being substantially limited to a relatively saturated color, that is, a color of relatively narrow spectral range both as to fluorescence and phosphorescence. The preparation of the phosphors need not be restricted to the exact processes described but may employ different fluxes such as ammonium chloride, sodium bromide, hydrogen bromide, magnesium carbonate or others in addition to or in place of the sodium or potassium chloride referred to above. Similarly, the crystallization temperature upon firing may be varied over a wide range such as from 800° C. to 1400° C. depending upon the time of heating and the pressure which may vary from 0.0001 to 1000 atmospheres, the best results usually being obtained near or above atmospheric pressure. The phosphors may further be provided either before or after crystallization with additions of elements or compounds thereof which have large atomic or ionic radii and low ionization potentials for the purpose of improving their secondary emitting properties, examples being rubidium, caesium, uranium or thorium either in addition to or in place of the barium compound referred to above.

While I have given only one specific example for the preparation of a copper-silver activated pure zinc sulphide, it will be appreciated that this method may be followed in the preparation of phosphors including two or more activator metals of the second sub-group of the first group of the periodic system without departing from the scope of my invention as set forth in the appended claims.

I claim:

1. A phosphor consisting of zinc compounded with an element of the group consisting of sulphur and selenium, said compound being spectroscopically pure and activated by a plurality of metals of the group consisting of silver, copper and gold, the amount of the plurality of metals being at a predetermined limit between 0.00001 and 0.1 molal per cent of each with respect to the spectroscopically pure compound and the relative quantity of said metals decreasing in the order recited.

2. A phosphor consisting of spectroscopically pure zinc selenide activated with two metals selected from the group consisting of silver, copper and gold, the quantity of each of said two metals being limited to an amount between 0.00001 and 0.1 molal per cent with respect to said spectroscopically pure zinc selenide and the relative quantity of the selected metals decreasing in the order recited.

3. A phosphor consisting of copper and silver activated spectroscopically pure zinc sulphide, the amount of copper in said phosphor being less than the amount of silver but being at least 0.00001 molal per cent with respect to said spectroscopically pure zinc sulphide.

4. A phosphor consisting of copper and gold activated zinc sulphide, said sulphide being spectroscopically free of multivalent metallic elements other than copper and gold.

5. A phosphor consisting of silver and gold activated zinc sulphide, said sulphide being spectroscopically free of multivalent metallic elements other than silver and gold.

6. A phosphor consisting of spectroscopically pure zinc sulphide activated with a plurality of metals selected from the group consisting of silver, copper and gold, the relative quantity of said metals decreasing in the order recited, the amount of gold being at least 0.00001 molal per cent with respect to the weight of said spectroscopically pure zinc sulphide.

7. A phosphor as claimed in claim 6 wherein the relative activator content decreases approximately as factors of 4, 2 and 1 in the order recited.

8. A phosphor consisting of zinc sulphide activated with copper and silver, the weight ratio of said copper and silver having a relation as 1 to 2.

HUMBOLDT W. LEVERENZ.